United States Patent [19]
Obayashi

[11] Patent Number: 5,699,240
[45] Date of Patent: Dec. 16, 1997

[54] PWM INVERTER CONTROL APPARATUS

[75] Inventor: Kazuyoshi Obayashi, Kariya, Japan

[73] Assignee: Nippondenso Co., Ltd., Kariya, Japan

[21] Appl. No.: 659,908

[22] Filed: Jun. 7, 1996

[30] Foreign Application Priority Data

Jun. 8, 1995 [JP] Japan .................................. 7-142225

[51] Int. Cl.⁶ .................................................. H02M 3/24
[52] U.S. Cl. .............................. 363/98; 318/811; 363/41
[58] Field of Search ............................ 363/98, 37, 43;
318/727, 807, 811, 802, 798

[56] References Cited

U.S. PATENT DOCUMENTS

| | | | |
|---|---|---|---|
| 4,629,959 | 12/1986 | Okuyama et al. | 318/727 |
| 4,641,075 | 2/1987 | Asano et al. | |
| 4,719,400 | 1/1988 | Kurakake et al. | 318/811 |
| 4,847,743 | 7/1989 | Kamiyama . | |

FOREIGN PATENT DOCUMENTS

| | | |
|---|---|---|
| 5-056649 | 3/1993 | Japan . |
| 6-014590 | 1/1994 | Japan . |
| 6-178549 | 6/1994 | Japan . |
| 6-233549 | 8/1994 | Japan . |

Primary Examiner—Peter S. Wong
Assistant Examiner—Rajnikant B. Patel
Attorney, Agent, or Firm—Cushman, Darby & Cushman

[57] ABSTRACT

An inverter control apparatus which employs a two-phase modulation without current waveform distortion and controllability deterioration. The inverter control apparatus includes a fixing interval decision circuit for deciding intervals of fixing respective PWM phase voltages to respective certain levels, a fixing signal generating circuit for generating a fixing signal which fixes the respective PWM phase voltages to respective certain levels during the intervals decided by the fixing interval decision circuit, a PWM signal generating circuit for generating a three-phase PWM signal based on the fixing signal and a voltage instruction value, and a fixing signal modifying circuit for modifying the fixing signal to prevent the three-phase PWM signal from exceeding capacity of the power supply.

9 Claims, 9 Drawing Sheets

PWM INVERTER CONTROL APPARATUS

CROSS REFERENCE TO RELATED APPLICATION

This application is based upon and claims priority of Japanese Patent Application No. Hei. 7-142225 filed on Jun. 8, 1995, the content of which is incorporated herein by reference.

BACKGROUND OF THE INVENTION

1. Field of the Invention

The present invention relates to an inverter control apparatus, and in particular to an inverter control apparatus using a two-phase modulation method whereby the voltage duty ratio of a certain phase of an inverter is fixed to 0% or 100% at a predetermined phase.

2. Description of Related Art

JP-A-6-233549 discloses an inverter control apparatus using PWM signals. To reduce the electromagnetic noise and the switching loss and to increase the power conversion efficiency, such apparatus uses the two-phase modulation method by PWM control which stops switching of the inverter at each phase by fixing the voltage level of such phase while the current of such phase is within the range of ±30° in electrical angle from the maximum current of such phase and which equally offsets the voltage of the remaining two phases. Such equal offset of the voltage for each phase can make it possible to control each phase current without an influence of the offset because the line voltage is constant.

Figure 10:
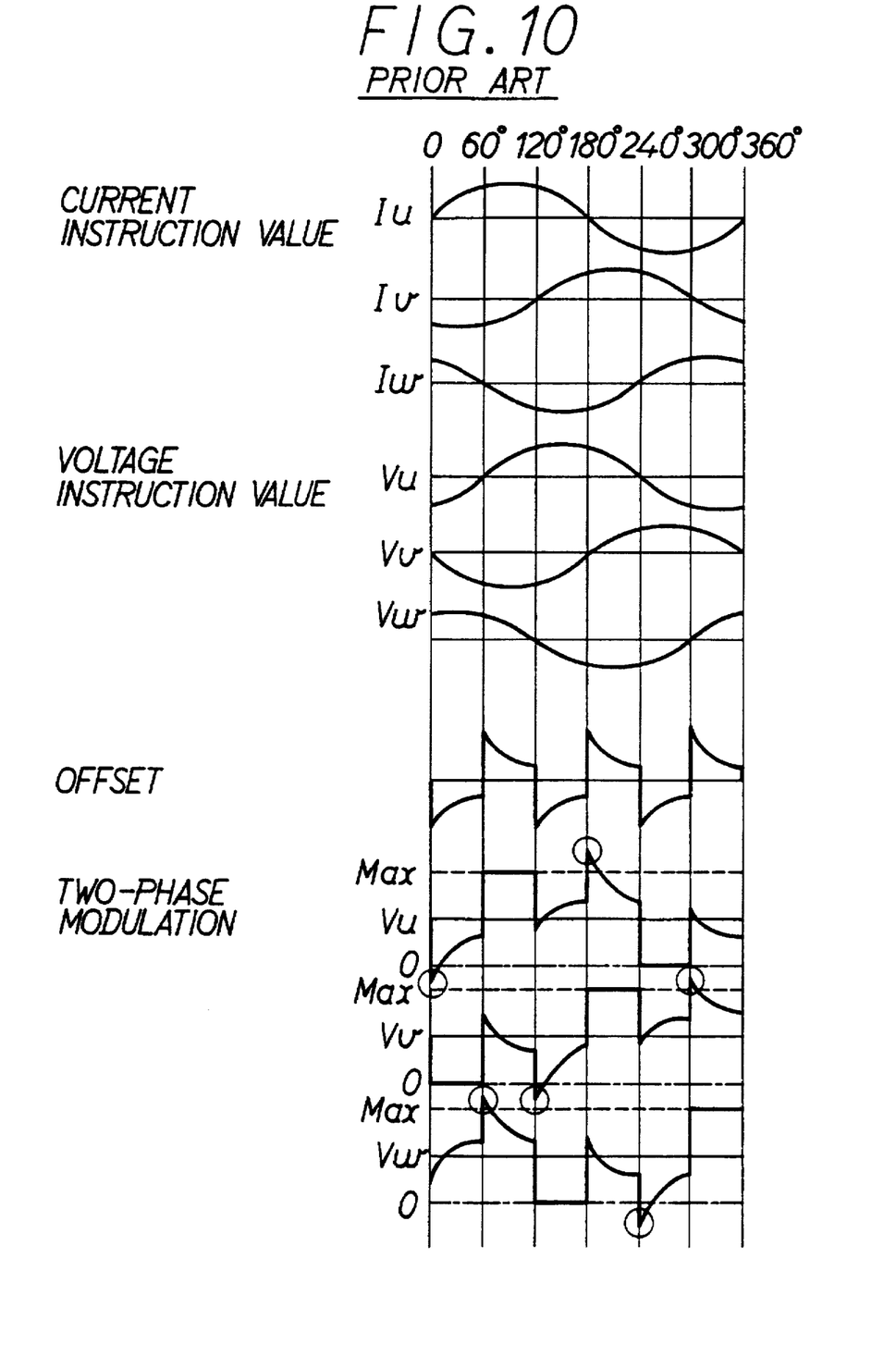
FIG. 10 is a signal waveform diagram for the explanation of the disadvantage of a conventional inverter control apparatus.

However, according to the conventional inverter control apparatus, since the offset of high voltage is required at a phase of which the voltage level is fixed when the phase of the applied voltage differs from the phase of the current instruction value, e.g., when the phase difference is 60° in electrical angle as shown in FIG. 10, the offset value becomes high. In this case, the voltage instruction value of other phases exceeds the voltage capacity of the inverter when the other phases are equally offset, and the inverter actually can not output such high voltage. Therefore, the distortion of the current waveform of a motor occurs and controllability deteriorates.

SUMMARY OF THE INVENTION

The present invention has an object to provide an inverter control apparatus in which a voltage instruction value controls the inverter so that the capacity of the power supply is not exceeded resulting in a two-phase modulation without causing current waveform distortion and controllability deterioration.

According to an inverter control apparatus of the present invention, a current instruction value is generated to determine a current to be supplied to a polyphase AC motor and a current of at least two phases of the polyphase AC motor is detected. An inverter impresses respective PWM phase voltages to respective phases of the polyphase AC motor. A voltage instruction value is calculated to determine a voltage to be applied to respective phases of the polyphase AC motor based on the current instruction value and the detected current.

Intervals for fixing the respective PWM phase voltages to respective certain levels during respective phase intervals are determined based on a state variable relating to the respective PWM phase voltages. A fixing signal is generated to fix the respective PWM phase voltages to respective certain levels during the determined intervals. A three-phase PWM signal is generated based on the fixing signal and the voltage instruction value. The fixing signal is modified to prevent the three-phase PWM signal from exceeding capacity of the power supply.

Since the fixing signal is modified to prevent the three-phase PWM signal from exceeding capacity of the power supply, it becomes possible to control the inverter not to produce an instruction for applying high voltage beyond the capacity of the power supply. Therefore, it becomes possible to avoid the distortion of the current waveform of the motor and the deterioration of controllability and to reduce the noise of electromagnetic wave and the switching loss at the inverter.

BRIEF DESCRIPTION OF THE DRAWINGS

Additional objects and advantages of the present invention will be more readily apparent from the following detailed description of preferred embodiments thereof when taken together with the accompanying drawings, in which.

DETAILED DESCRIPTION OF THE PRESENTLY PREFERRED EMBODIMENTS

The preferred embodiments of the present invention are hereinafter described with reference to the accompanying drawings.

Figure 1:
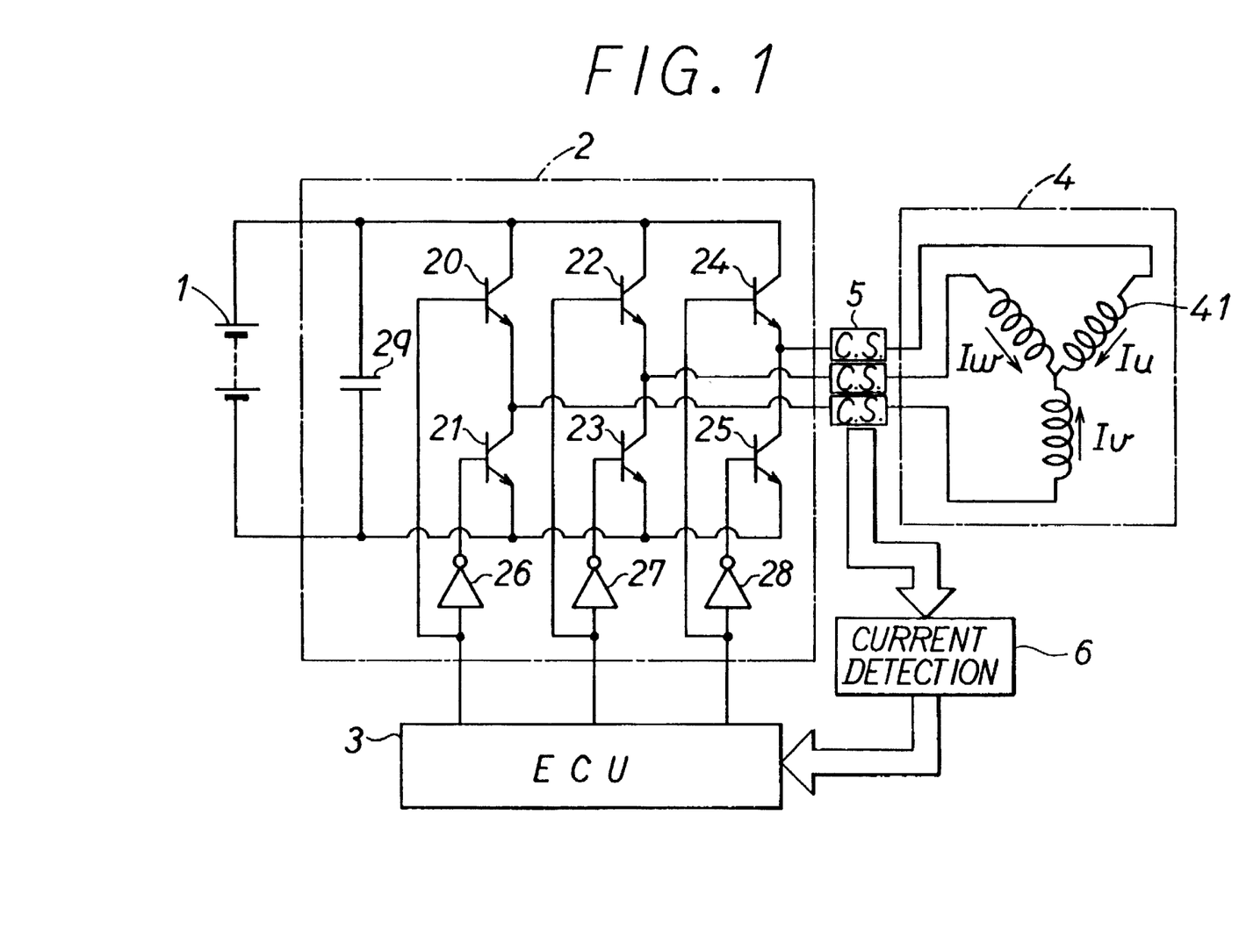
FIG. 1 is a circuit diagram showing an inverter control apparatus according to an embodiment of the present invention.

FIG. 1 shows a motor control system for an electric automobile according to a preferred embodiment of the present invention. In FIG. 1, the motor control system includes a main battery 1, an inverter 2, an ECU (Electronic Control Unit) 3 functioning as a control unit, a three-phase AC motor 4, current sensors (c.s.) 5 which detect current of respective phases of the motor 4, and a current detection circuit 6 which detects current of at least two phases of the motor 4 by means of current sensors 5.

In this embodiment, the main battery 1 employs a lead storage battery, supplies electric power to the motor 4 through the inverter 2, and regenerates and stores electric power in the case of regeneration. The main battery 1 can be replaced by other batteries than the lead storage battery.

The inverter 2 includes six switching elements (IGBT: Insulated Gate Bipolar Transistor) 20 through 25, three negative logic elements (inverter gates) 26 through 28 and a smoothing capacitor 29. The inverter 2 impresses voltage to respective phases of the motor 4 according to switching control by the ECU 3. The motor 4 includes three-phase coil 41, and rotates or regenerates by excitation of the coil 41.

Figure 2:
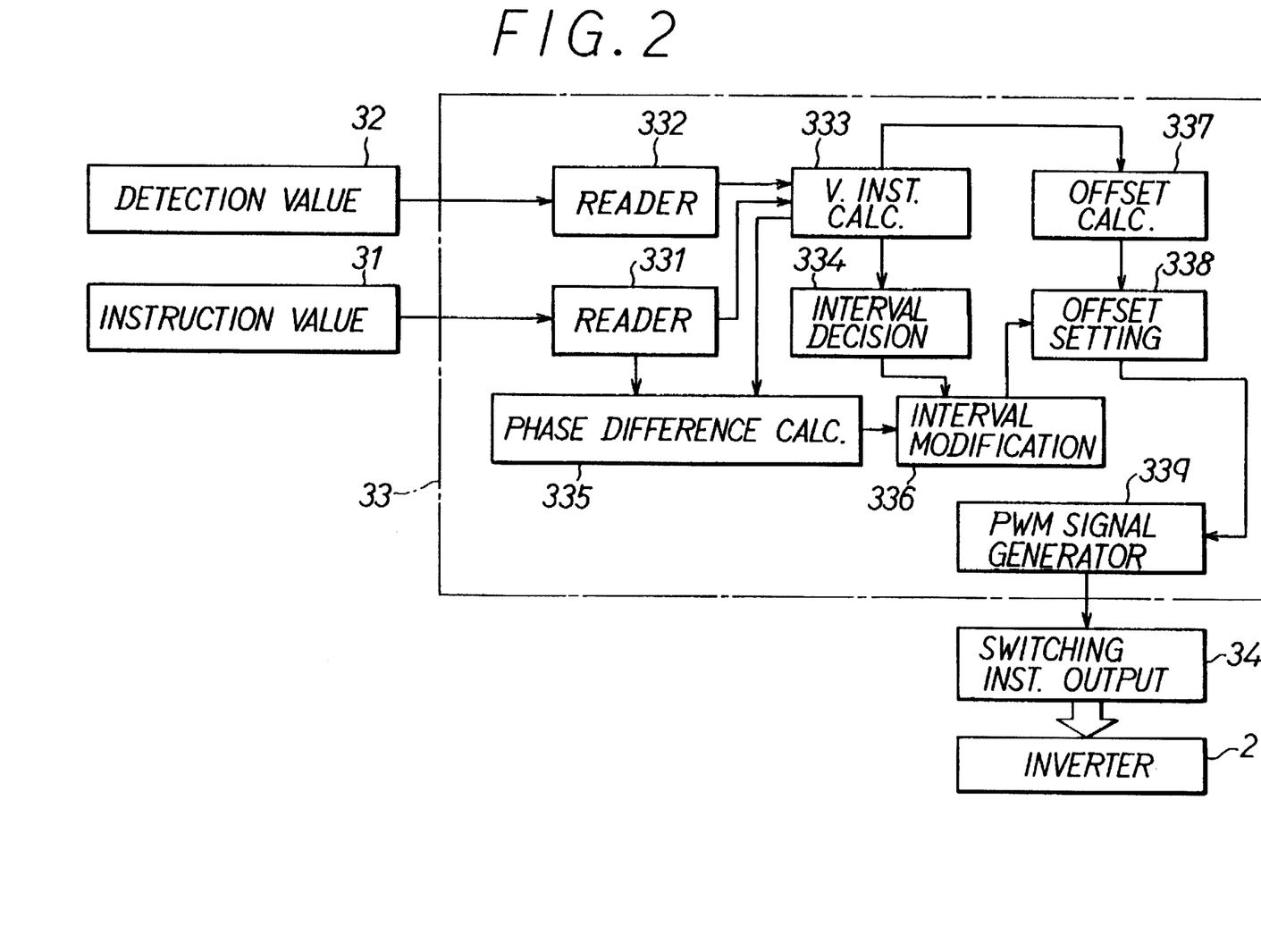
FIG. 2 is a block diagram showing a functional configuration of an ECU according to the embodiment of the present invention.

As shown in FIG. 2, the ECU 3, functioning as a motor control unit, includes an instruction value input circuit 31, a detection value input circuit 32, an MPU (Microprocessing Unit) 33 and a switching instruction output circuit 34. Current instruction values are input from an automobile control apparatus to the instruction value input circuit 31. Current, voltage of the battery 1, voltage of the terminals of the motor 4, number of revolution (signals of encoder and resolver) of the motor 4 and the like detected by the current detection circuit 6 and the like respectively are input to the detection value input circuit 32. The MPU 33 calculates voltage instruction values of respective phases based on current instruction values and the detected values, and executes the two-phase modulation control according to such voltage instruction values of respective phases. The switching instruction output 34 outputs switching signals to the inverter 2 according to the calculation results of the MPU 33.

Details of the MPU 33 will be described hereafter. The MPU 33 which executes the inverter control calculation includes an instruction value reader 331, a detection value reader 332, a voltage instruction value calculator 333, a two-phase modulation interval decision circuit 334, a phase difference calculator 335, two-phase modulation modifying circuit 336 which limits or shifts the two-phase modulation intervals, an offset calculator 337, an offset setting circuit 338 and a PWM signal generator 339.

The instruction value reader 331 reads in current instruction values, current instruction vectors or the like of respective phases.

The detection value reader 332 reads in motor current of respective phases, number of revolution of the motor and the like. Such motor current can be read in through the current detection circuit 6 by detecting three actual current values of respective phases by the current sensors 5, or can be read in by detecting two actual current values of any two phases by the current sensors 5 and calculating the remaining current value. Such number of revolution of the motor can be read in as an output from a rotation sensor.

The voltage instruction value calculator 333 calculates voltage instruction values by feedback based on the current instruction values and the actual current values, or by feedforward based on the current instruction values.

The following is a way to execute feedback control for calculation of the voltage instruction values. Each voltage of respective phases is calculated as:

$V_{uref}=(I_{uref}-I_u)*(Kp+Ki/s)$ $V_{vref}=(I_{vref}-I_v)*(Kp+Ki/s)$ $V_{wref}=(I_{wref}-I_w)*(Kp+Ki/s)$ wherein Kp and Ki represent proportional gain and integral gain, respectively and are written by S-function of Laplace transform. The voltage instruction values are calculated by conversion from dq-axis voltage instruction values calculated from the above equations to three-phase voltage instruction values.

Another way to calculate the voltage instruction values is to execute feedback control on the dq-axis after three-phase/two-phase conversion as follows.

$V_{dref}=(I_{dref}-I_d)*(Kp1+Ki1/s)$ $V_{qref}=(I_{qref}-I_q)*(Kp2+Ki2/s)$

Another way to calculate the voltage instruction values is to execute feedforward control based on motor constants and the current instruction values. In case of control of synchronous motor, denoting resistance, inductance, magnetic flux and number of revolution by R, L, $\Psi$ and $\omega$, respectively as the motor constants, dq-axis voltage instruction values are calculated as follows.

$V_{dref}=R*I_{dref}-\Omega*L_q*I_{qref}$ $V_{qref}=\omega*L_d*I_{dref}+R*I_{qref}+\omega*\Psi a$ In this case, it may be possible to control by using parameters obtained from adjustment of the motor constants according to actual current.

Furthermore, it may also be possible to calculate the voltage instruction values by feedback and feedforward based on the motor constants, the current instruction values and the actual current as follows.

$V_{dref}=R*I_{dref}-\omega*L_q*I_{qref}+(I_{dref}-I_d)*Kp1$ $V_{qref}=\omega*L_d*I_{dref}+R*I_{qref}+\omega*\Psi a+(I_{qref}-I_q)*Kp2$ Although the voltage instruction value calculator 333 is a continuous time system in this embodiment, it may be possible to use a discrete time system instead.

The voltage instruction values are calculated by conversion from dq-axis voltage instruction values calculated from any of the equations described above to three-phase voltage instruction values.

The two-phase modulation interval decision circuit 334 selects phases from U-phase, V-phase and W-phase according to respective phases of current instruction values to fix outputs from the inverter 2 during such selected phases and determines intervals to offset voltage instruction values.

Figure 3:
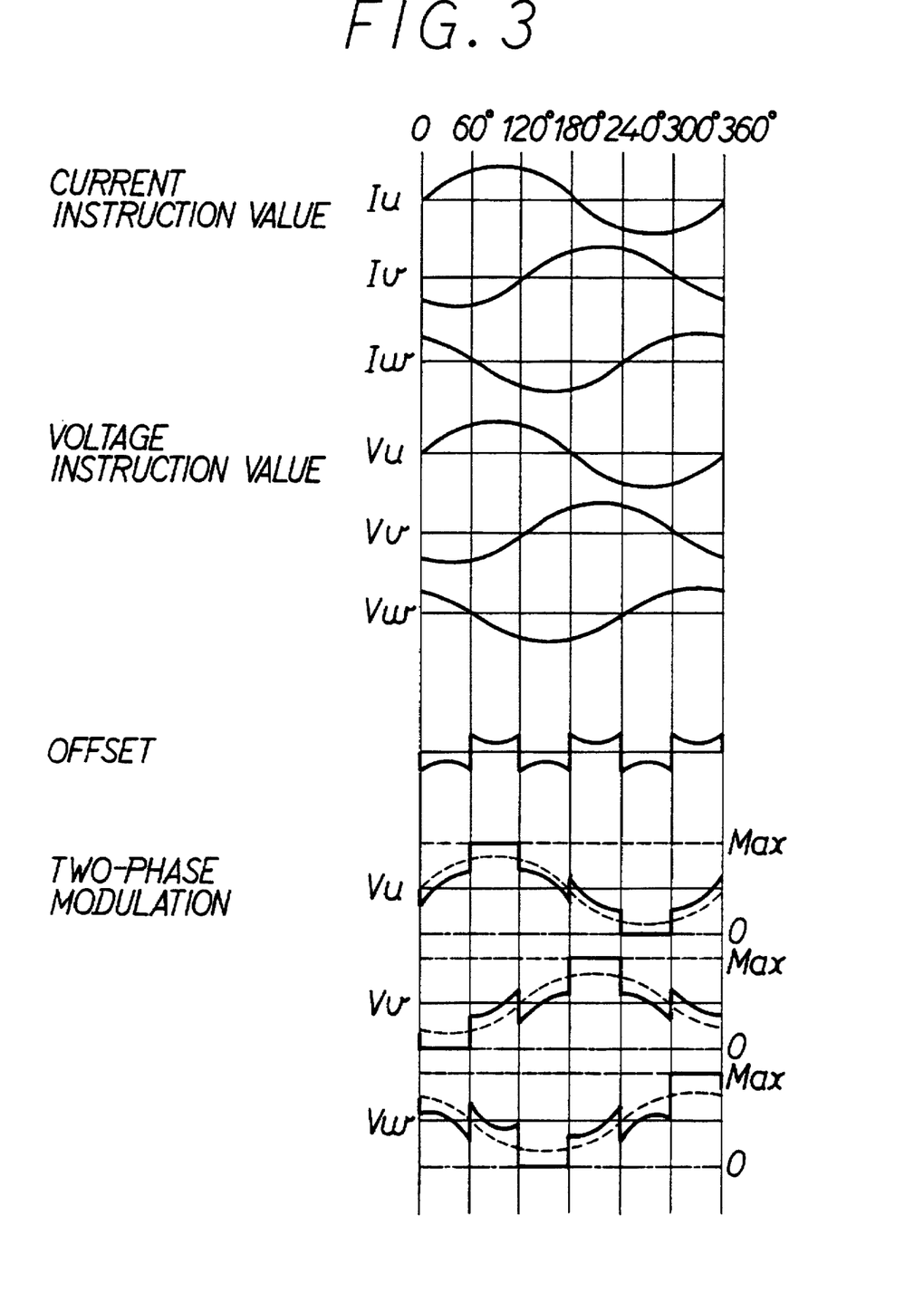
FIG. 3 is a signal waveform diagram showing the operation when no phase difference exists between a current instruction value and a voltage instruction value according to the embodiment of the present invention.

For example, the two-phase modulation interval decision circuit 334 selects phases within the range of ±30° (electrical angle) from the peak of respective current instruction values of U-phase, V-phase and W-phase to fix outputs from the inverter 2 during such selected phases and determines such selected phases as output fixing intervals as shown in FIG. 3.

The phase difference calculator 335 calculates a phase difference $\Theta_{ref}$ from a vector of current instruction value and a vector of voltage instruction value, that is, $\Theta_{ref}$ is calculated from current instruction value $I_{ref}=(I_{dref}, I_{qref})$ and voltage instruction value $V_{ref}=(V_{dref}, V_{qref})$ as follows.

$\Theta_{ref}=\cos^{-1}\{(I_{ref}\cdot V_{ref})/(|I_{ref}|\cdot|V_{ref}|)\}$

Letting $\Theta_v=\tan^{-1}(V_{qref}/V_{dref})$ and $\Theta_i=\tan^{-1}(I_{qref}/I_{dref})$, $\Theta_{ref}$ may also be possible to be calculated as follows.

$\Theta_{ref}=\Theta_v-\Theta_i$

Figure 4:
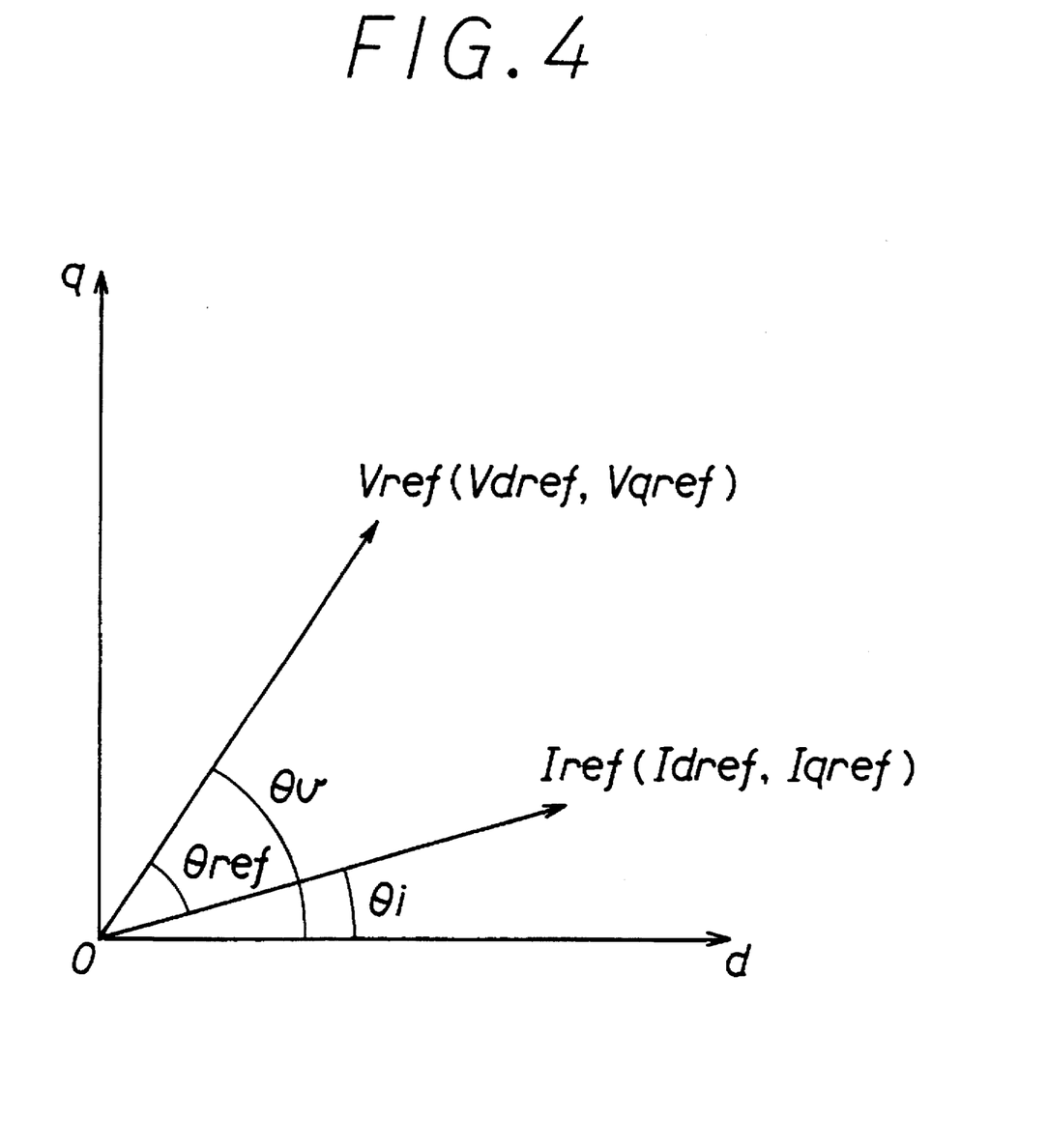
FIG. 4 is a vector diagram showing the relationship between the current instruction value, the voltage instruction value and a phase difference according to the embodiment of the present invention.

The relationship between the vector of current instruction value $(I_{dref}, I_{qref})$, the voltage instruction value $(V_{dref}, V_{qref})$ and the phase difference $\Theta_{ref}$ is shown in FIG. 4.

The two-phase modulation modifying circuit 336 limits or shifts the two-phase modulation intervals based on the phase difference $\Theta_{ref}$ in order that voltage instruction values of respective phases after the two-phase modulation should not exceed the battery capacity.

For example, when the phase difference $\Theta_{ref}$ is 60° as shown in FIG. 10, the two-phase modulation interval is limited not to execute the two-phase modulation during the term of 30° (circled area in FIG. 10) because voltage instruction values exceed the battery capacity in the two-phase modulation method during such term.

Figure 5:
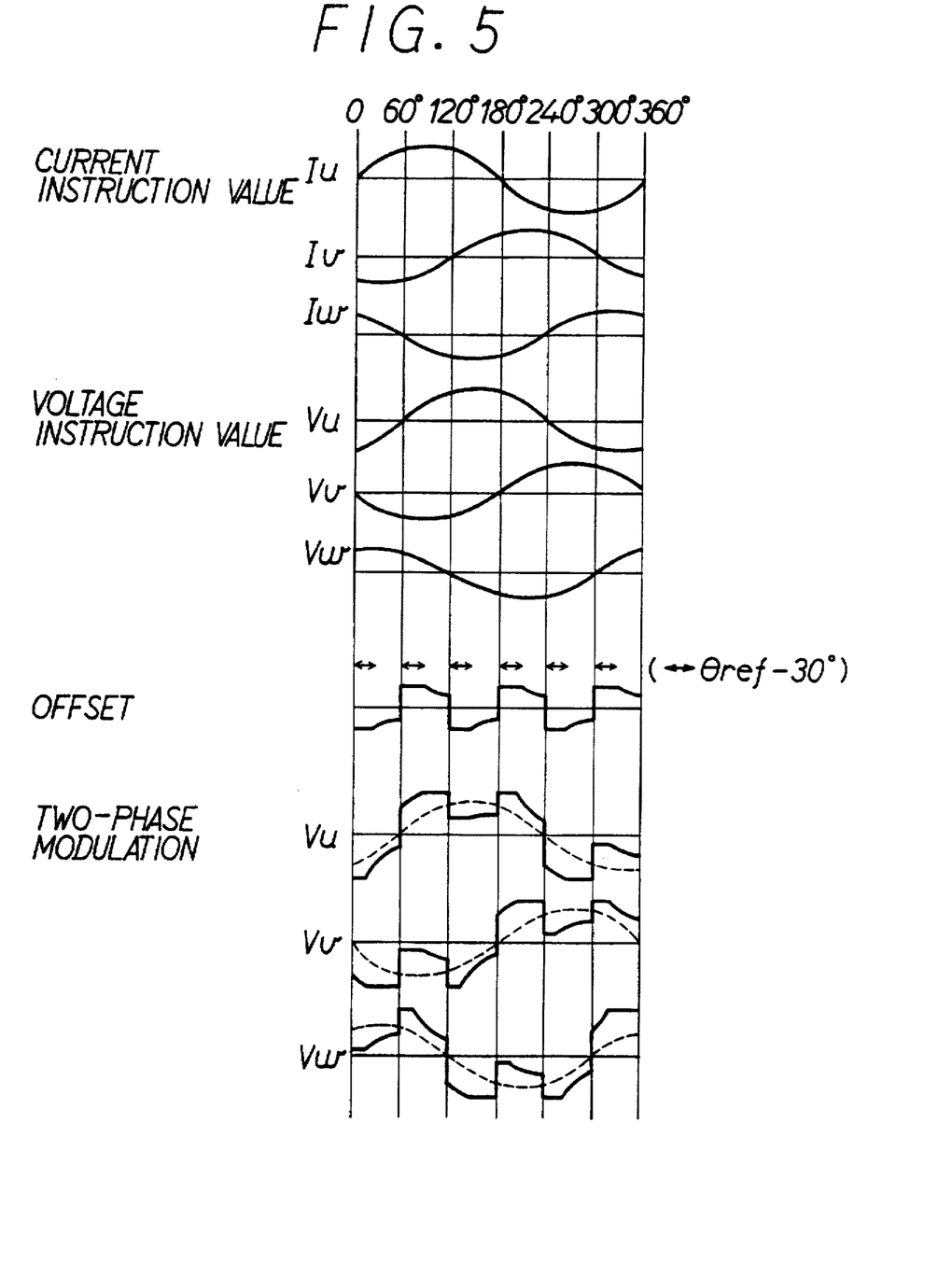
FIG. 5 is a signal waveform diagram showing the operation when two-phase modulation intervals are limited according to the embodiment of the present invention.

That is, when the phase difference $\Theta_{ref}$ calculated by the phase difference calculator 335 exceeds 30°, the two-phase modulation modifying circuit 336 limits not to execute the two-phase modulation at arrowed area (area of $\Theta_{ref}$–30°) setting up current instruction values of respective phases as a standard as shown in FIG. 5.

According to this limitation, PWM voltage instruction values beyond the battery capacity are not output. As a result, no distortion of voltage waveform and current waveform occurs.

Instead of limiting the two-phase modulation intervals based on the phase difference, it may be possible to prevent the output of the PWM voltage instruction values beyond the battery capacity by limiting offset values of respective phases in such a manner that each sum of the offset value of one phase and voltage instruction value of two other phases after the two-phase modulation does not exceed the battery capacity.

Figure 6:
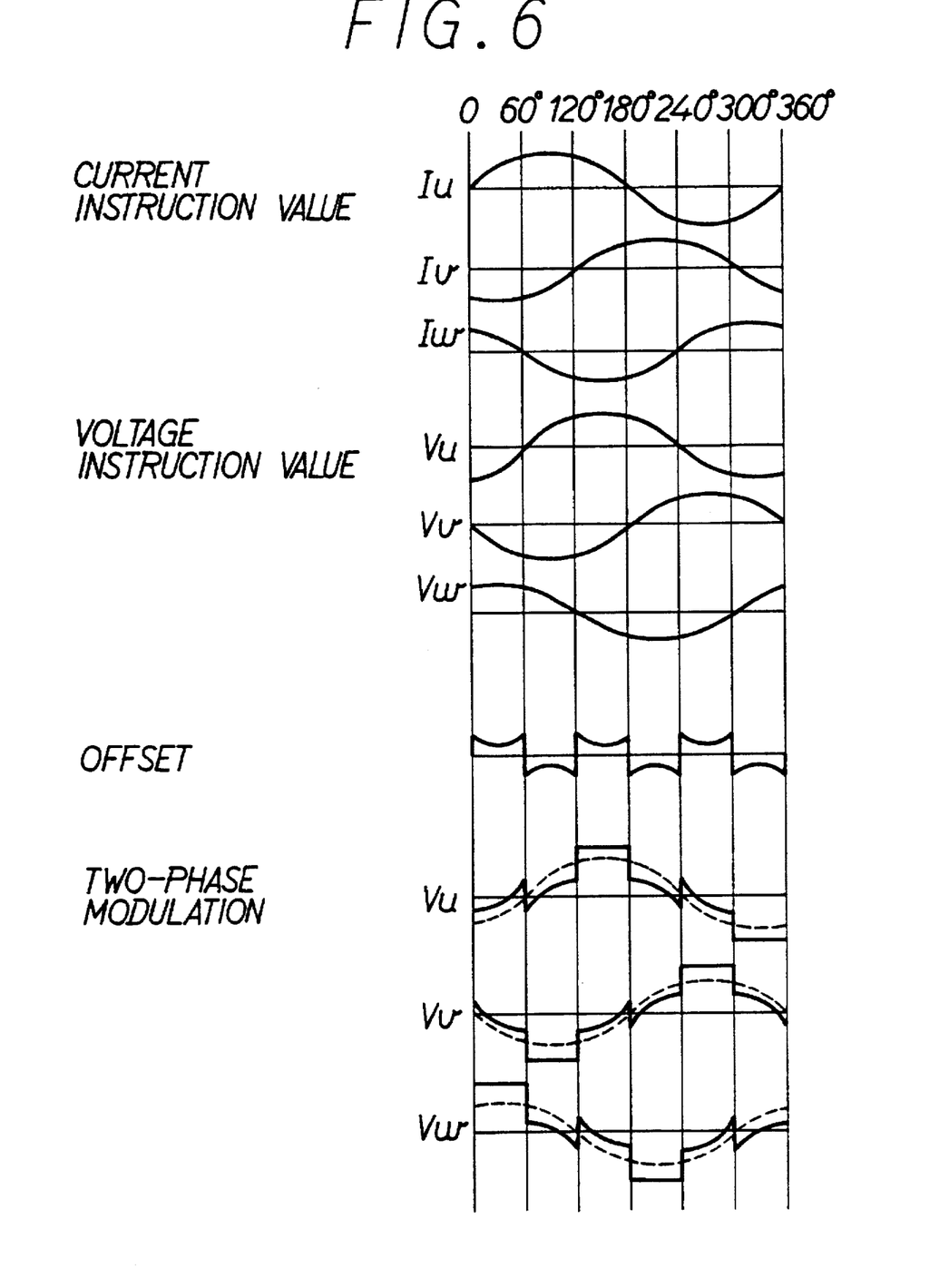
FIG. 6 is a signal waveform diagram showing the operation when the two-phase modulation intervals are shifted according to the embodiment of the present invention.

Another example of the two-phase modulation modifying circuit 336 is shown in FIG. 6. As shown in FIG. 6, it may be possible to prevent voltage instruction values from exceeding the battery capacity under the two-phase modulation by shifting execution intervals of the two-phase modulation.

That is, when the phase difference $\Theta_{ref}$ exceeds 30°, the two-phase modulation modifying circuit 336 shifts the intervals of the two-phase modulation by the shift value $\Theta_{shift}$. The setting range of the shift value $\Theta_{shift}$ is given as follows.

$$\Theta_{ref}-30°<\Theta_{shift}<\Theta_{ref}+30°$$

FIG. 6 shows the state of current and voltage when $\Theta_{ref}$ =60°. According to the above inequality, the setting range of the shift value in this case is given as follows.

$$30°<\Theta_{shift}<90°$$

In FIG. 6, an example when $\Theta_{shift}$=60° is shown.

According to this shift of the intervals of the two-phase modulation, PWM voltage instruction values beyond the battery capacity are not output. As a result, no distortion of voltage waveform and current waveform occurs.

The offset calculator 337 calculates offset values to fix voltage of respective phases to certain levels by using peak voltage of a triangular wave and voltage instruction value of a phase whose duty ratio is fixed. The way of calculation is explained hereafter by referring to FIG. 7.

Figure 7:
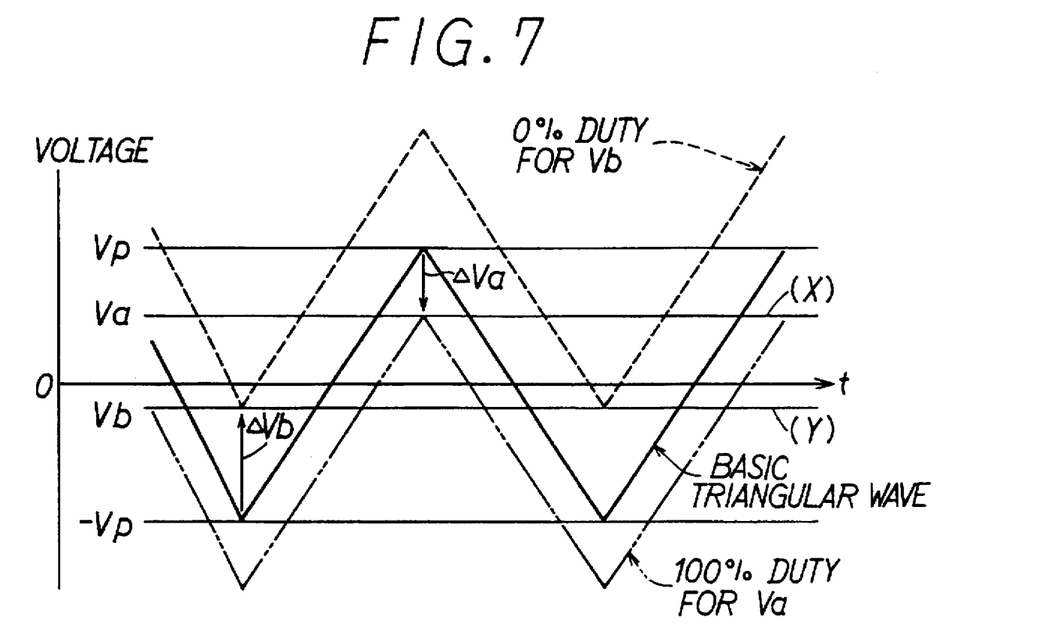
FIG. 7 is a signal waveform diagram for the explanation of the calculation of offset values according to the embodiment of the present invention.

The forming of PWM waveform of two-phase modulation at the PWM signal generator 339 can be realized by adding instruction value of a phase whose switching is stopped to the triangular wave. Therefore, how to derive the shift value of the triangular wave is explained as follows.

For brevity, it is now assumed that the output of the U-phase is represented by a straight line (X) in FIG. 7, the potential thereof is Va, and the peak voltage of the triangular wave for normal driving PWM is Vp. In this case, for making the duty ratio of the U-phase PWM signal equivalent to 100%, it suffices that the positive peak of the triangular wave is Va. Denoting the shift value by $\Delta Va$, the shift value $\Delta Va$ is derived by the following equation.

$$\Delta Va=Va-Vp=Va+(-Vp)$$

That is to say, the shift value $\Delta Va$ can be derived by addition of the negative peak value of the triangular wave and the U-phase output.

When the current instruction value is a straight line (Y), a shift value $\Delta Vb$ to make the duty ratio equivalent to 0% is derived by the following equation in the same way as the above described case.

$$\Delta Vb=Vb-Vp=Vb+Vp$$

That is, the shift value $\Delta Vb$ can be derived by addition of the positive peak value of the triangular wave and the U-phase output.

Shift values for other phases can be derived in the same way by addition of the output of respective phases and ±peak value of the triangular wave.

To remove the noise component of the offset, it may be possible to filter the calculated offset values through a low pass filter.

The offset setting circuit 338 of respective phases offsets the voltage of two other phases than the phase whose voltage is fixed.

Figure 8:
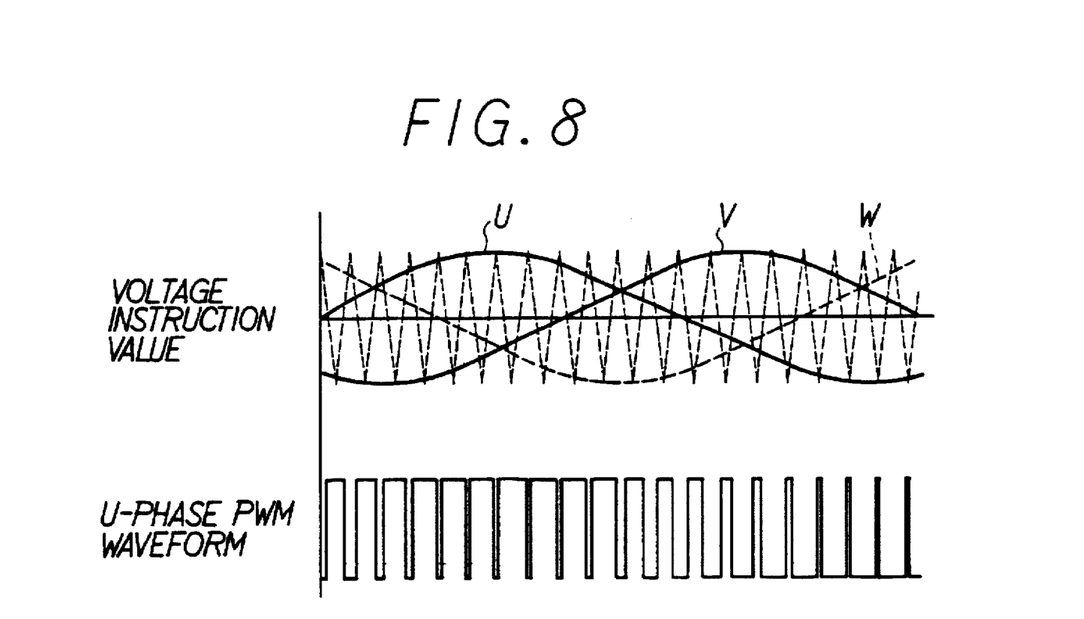
FIG. 8 is a signal waveform diagram showing the relationship between the phase voltage and the PWM signal according to the embodiment of the present invention.

The PWM signal generator 339 is a PWM port provided in the MPU 33. As shown in FIG. 8, the PWM signal generator 339 generates each PWM signal of respective phases according to respective voltage instruction values of respective phases. FIG. 8 shows the U-phase PWM signal.

Figure 9:
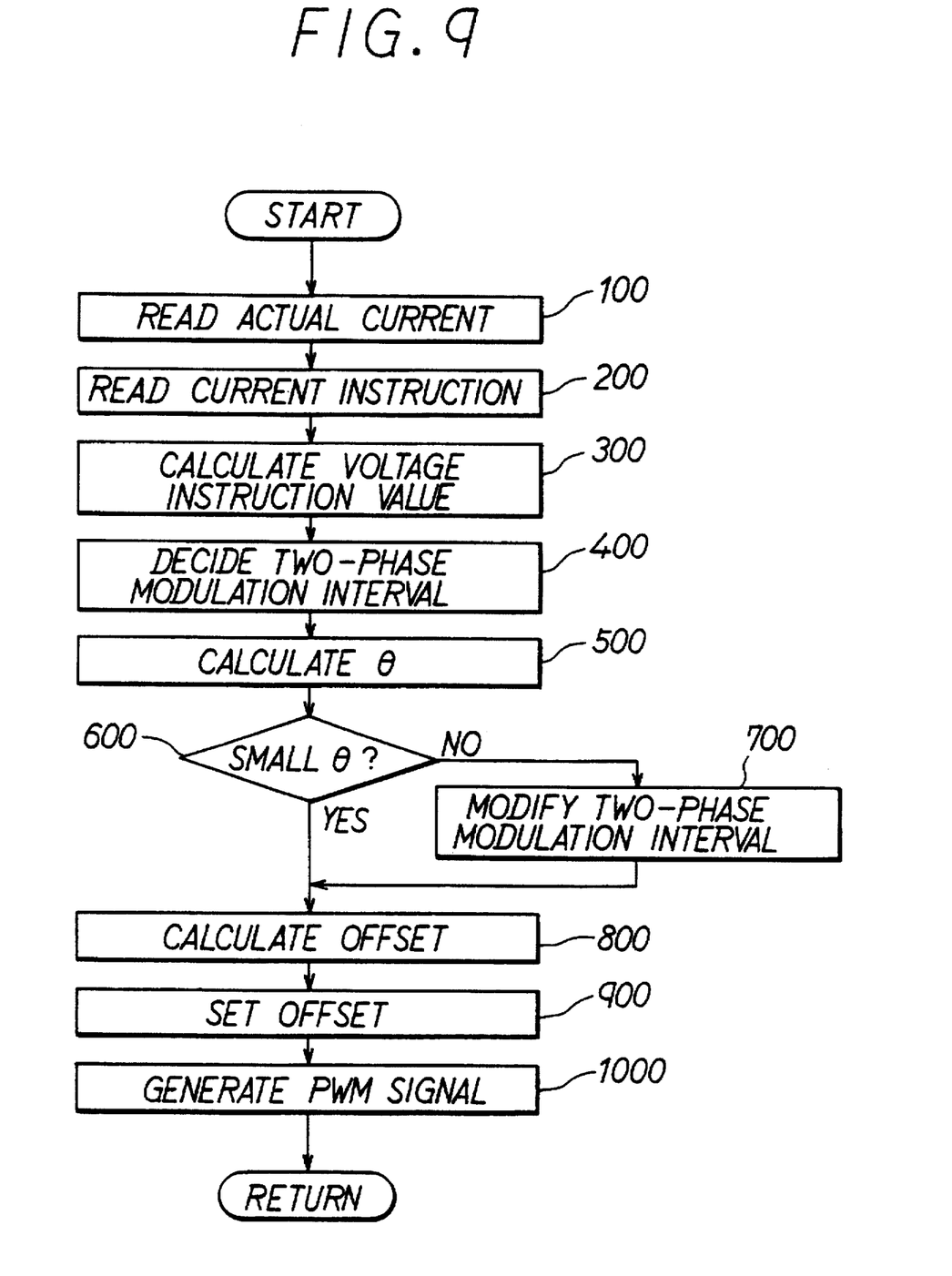
FIG. 9 is a flowchart for the explanation of the control operation according to the embodiment of the present invention.

FIG. 9 is a flowchart showing the calculation of the embodiment described above.

In FIG. 9, the inverter control apparatus reads actual current (step 100), reads the current instruction value (step 200), calculates the voltage instruction value from such actual current, current instruction value and the like (step 300) and determines the two-phase modulation interval to fix the output of the inverter 2 to certain level at respective phases (step 400).

On the other hand, it calculates the phase difference $\Theta_{ref}$ between the current instruction value and the voltage instruction value (step 500). When the phase difference $\Theta_{ref}$ is large (NO in step 600), the two-phase modulation interval is changed by the limitation or the shift (step 700). The offset calculation is made during the two-phase modulation interval decided based on the phase difference $\Theta_{ref}$ (step 800) and the offset is set according to the offset value (step 900), then, the PWM signals are generated (step 1000).

By using the described above control, when the phase difference between the current instruction value and the voltage instruction value is not large, the two-phase modulation which keeps the state to stop switching at one phase of the inverter 2 while switching at the other two phases during respective phase intervals decided based on the current instruction values of respective phase voltages. Therefore, when the phase difference between the current instruction value and the voltage instruction value is small, the inverter control apparatus described in the embodiment can reduce the noise of electromagnetic wave and the switching loss at the inverter and can drive the motor at a high power conversion efficiency.

When the phase difference between the current instruction value and the voltage instruction value is large, respective phase voltages are impressed under the condition that the two-phase modulation interval of the inverter 2 is limited or shifted. Therefore, when the phase difference between the current instruction value and the voltage instruction value is large, the inverter control apparatus described in the embodiment can be driven under the two-phase modulation method within the range of the battery capacity of the inverter 2 and can avoid the distortion of the current waveform and the deterioration of the controllability.

Although the present invention has been fully described in connection with the preferred embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. An inverter control apparatus for driving a polyphase AC motor by power from a power supply, said apparatus comprising:

a current instruction value generating means for generating current instruction value which determines current to be supplied to said polyphase AC motor;

a current detecting means for detecting current of at least two phases of said polyphase AC motor;

an inverter which impresses respective PWM phase voltages to respective phases of said polyphase AC motor;

a voltage instruction value calculating means for calculating voltage instruction value which determines voltage to be applied to the respective phases of said polyphase AC motor based on said current instruction value generated by said current instruction value generating means and said current detected by said current detecting means;

a fixing interval decision means for deciding intervals of fixing said respective PWM phase voltages to respective certain levels during respective phase intervals decided based on a state variable relating to said respective PWM phase voltages;

a fixing signal generating means for generating a fixing signal which fixes said respective PWM phase voltages to the respective certain levels during said intervals decided by said fixing interval decision means;

a PWM signal generating means for generating a PWM signal based on said fixing signal and said voltage instruction value; and a fixing signal modifying means for modifying said fixing signal to prevent said PWM signal from exceeding capacity of said power supply.

2. An inverter control apparatus according to claim 1, wherein:

said fixing signal modifying means includes a phase difference detecting means for detecting a phase difference between said current instruction value and said voltage instruction value and an interval modifying means for modifying said intervals of fixing decided by said fixing interval decision means based on said phase difference detected by said phase difference detecting means.

3. An inverter control apparatus according to claim 2, wherein:

said interval modifying means limits said intervals of fixing decided by said fixing interval decision means based on said phase difference detected by said phase difference detecting means.

4. An inverter control apparatus according to claim 2, wherein:

said interval modifying means shifts said intervals of fixing decided by said fixing interval decision means based on said phase difference detected by said phase difference detecting means.

5. An inverter control apparatus according to claim 1, wherein:

said fixing signal modifying means includes an offset value modifying means for modifying an offset value of a basic voltage signal which is a datum for generating said PWM signal based on said voltage instruction value and said fixing signal, and said PWM signal generating means generates said PWM signal based on said voltage instruction value and said basic voltage signal whose offset value is modified by said offset value modifying means.

6. An inverter control apparatus according to claim 1, wherein:

said state variable relating to said respective PWM phase voltages is said current instruction value and said fixing interval decision means decides said intervals of fixing based on said current instruction value.

7. An inverter control apparatus according to claim 1, wherein:

said current instruction value generating means, said voltage instruction value calculating means, said fixing interval decision means, said fixing signal generating means, said PWM signal generating means and said fixing signal modifying means are performed by a microcomputer including a PWM port as said PWM signal generating means.

8. An inverter control apparatus for driving a polyphase AC motor comprising:

a current instruction value generating means for generating current instruction value which determines current to be supplied to said polyphase AC motor;

a current detecting means for detecting current of at least two phases of said polyphase AC motor;

an inverter which impresses respective PWM phase voltages to respective phases of said polyphase AC motor;

a voltage instruction value calculating means for calculating voltage instruction value which determines voltage to be applied to the respective phases of said polyphase AC motor based on said current instruction value generated by said current instruction value generating means and said current detected by said current detecting means;

a phase difference detecting means for detecting a phase difference between said current instruction value and said voltage instruction value;

a fixing interval decision means for deciding intervals of fixing said respective PWM phase voltages to respective certain levels based on said phase difference detected by said phase difference detecting means; and a PWM signal generating means for generating a PWM signal based on said intervals of fixing decided by said fixing interval decision means and said voltage instruction value.

9. An inverter control apparatus according to claim 8, wherein:

said current instruction value generating means, said voltage instruction value calculating means, said phase difference detecting means, said fixing interval decision means and said PWM signal generating means are performed by a microcomputer including a PWM port as said PWM signal generating means.

* * * * *